United States Patent [19]

Maruyama

[11] 3,821,810

[45] June 28, 1974

[54] TAPE RECORDER

[75] Inventor: Yoshio Maruyama, Saitama, Japan

[73] Assignee: Pioneer Electronic Corporation, Tokyo, Japan

[22] Filed: June 28, 1971

[21] Appl. No.: 157,590

[30] Foreign Application Priority Data

June 27, 1970 Japan .............................. 45-56264

[52] U.S. Cl. .............................................. 360/96

[51] Int. Cl. ........................................... G11b 15/26

[58] Field of Search ............ 242/206, 198; 274/4 D, 274/11 D, 4 C, 11 C

[56] References Cited

UNITED STATES PATENTS

| | | | |
|---|---|---|---|
| 3,533,633 | 10/1970 | Wilder | 274/4 D |
| 3,661,396 | 5/1972 | Sterly | 274/4 D |
| 3,664,672 | 5/1972 | Fujikawa et al. | 274/4 D |

*Primary Examiner*—Harry N. Haroian
*Attorney, Agent, or Firm*—Sughrue, Rothwell, Mion, Zinn & Macpeak

[57] ABSTRACT

In a reversible tape recorder, means are provided for effecting a direction of tape feeding during the reproducing operation that corresponds to the direction of tape feeding during the fast feeding operation, when there is a change from the fast feeding to the reproducing operation. Such means comprise a rotatable cam plate which is rotatable in opposite directions to effect changes in the tape feeding direction.

3 Claims, 4 Drawing Figures

PATENTED JUN 28 1974 3,821,810

SHEET 1 OF 4

TAPE RECORDER

BACKGROUND OF THE INVENTION

The present invention relates to a reversible tape recorder and, more particularly, to a drive mechanism enabling a tape recorder to effect round-trip recording and reproducing.

Hitherto, there has been offered a great variety of tape drive reversal mechanisms, but these mechanisms have been complex and bulky, so that many problems have arisen in the course of manufacturing and repairing when such mechanisms have been applied to a tape recorder using a small tape cartridge of the two reel type or employing commonly used present day reels.

Moreover, because of high cost of such reversal mechanisms, there are on the market only a small number of tape recorders for small size cartridges which include a tape drive reversal mechanism. Thus, in order to effect reverse feeding, many tape recorders require the user to take out the cartridge, to turn it over and to re-insert it into the recorder. To this end, some tape recorders possess a simple mechanism for indicating the termination of wind up.

In one of the conventional reversible tape recorders, since a fast feeding mechanism is adapted independently to a drive mechanism for recording, when a tape is released from a fast feeding condition, the tape recorder is returned to the non-operating state.

The other variety of conventional reversible tape recorders is changed, when the tape recorder is released from a fast feeding condition, to a recording condition in which the tape is always fed in a predetermined direction. In this apparatus, there is an advantage in that when the tape feeding direction which is needed in the reproducing condition corresponds to the predetermined direction, the fast forward winding operation and the fast rewinding operation are very useful. But there has been a disadvantage in that when the tape feeding direction which is needed in the reproducing condition does not correspond to the settled direction, the tape is fed in the reverse direction. Therefore, changing buttons of the tape recorder must be actuated in order to reproduce the needed tape track.

The above-mentioned two types of recorders are unsuitable in a reciprocal tape recorder.

SUMMARY OF THE INVENTION

A primary object of the present invention is to provide a reversible tape recorder wherein, when the reproducing condition is changed from the fast feeding operation, the tape feeding direction during reproducing corresponds with the fast feeding direction.

Another object of the present invention is to provide a reversible magnetic tape recorder in which tape feeding directions can be changed by a reversible cam plate.

A further object of the present invention is to provide a tape recorder which can be changed between recording or reproducing automatically using a cam plate and a plunger.

BRIEF DESCRIPTION OF THE DRAWINGS

Other objects and features of the present invention will become clear from the following description of a preferred embodiment constructed in accordance with the present invention with reference to the drawings, in which.

DESCRIPTION OF THE PREFERRED EMBODIMENT

Figure 1:
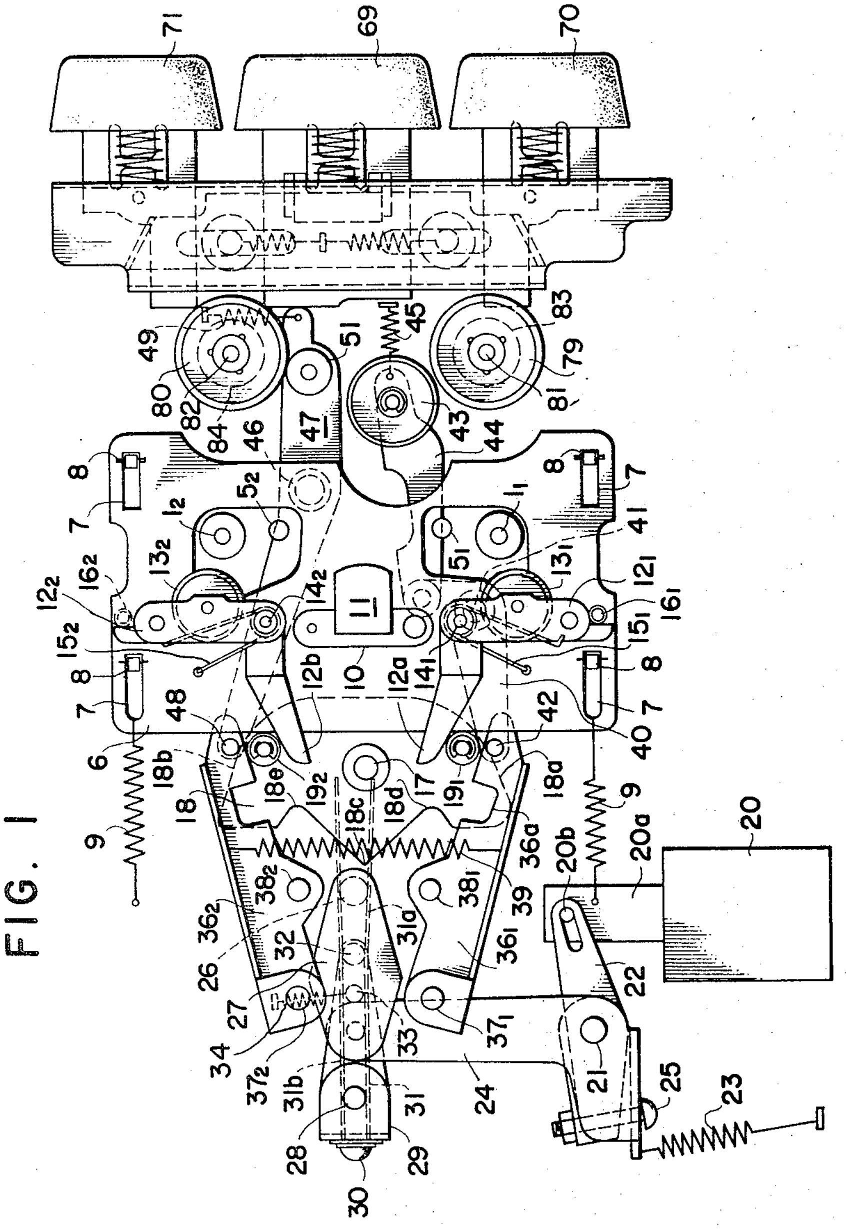
FIG. 1 is a plan view of the present apparatus in the disabled condition.

As shown in the drawings, capstans $1_1$ and $1_2$ are coupled with rotation axes of flywheels $2_1$ and $2_2$, respectively, and rotational power is transmitted from a pulley 3 mounted on a rotational shaft of an electric motor for rotation therewith through a belt 4 to the flywheels in such a way that the flywheels are rotated in opposite directions. Secured on a chassis (not shown) are pins $5_1$ and $5_2$ for supporting a tape cartridge of the "reel-to-reel" type. A shiftable base plate 6 having four guide grooves 7 and four rollers 8, each pair at one of the four corners thereof, is shiftable to and fro and is normally biased rearwardly by springs 9. On a holding member 10 provided on the shiftable base plate 6, a magnetic head 11 is fixedly disposed, and on holding frames $12_1$ and $12_2$ provided on the plate 6, pinch rollers $13_1$ and $13_2$ are rotatably fixed, respectively. The holding frames $12_1$ and $12_2$ are supported rotatably on shafts $14_1$ and $14_2$ , respectively, and are biased toward the capstans $1_1$ and $1_2$ by springs $15_1$ and $15_2$ provided on the shafts $14_1$ and $14_2$ to contact therewith. Depicted by numerals $16_1$ and $16_2$ are stoppers to restrict the rotational movement of the frames $12_1$ and $12_2$. The holding frames $12_1$ and $12_2$ have rearwardly extending operation ends 12*a* and 12*b*, and the ends 12*a* and 12*b* are biased to contact with pins $19_1$ and $19_2$ provided on a cam plate 18 rotatably carried on a rotational shaft 17 by the springs $15_1$ and $15_2$.

When the present tape recorder is in the non-operating state as shown in FIG. 1, the pins $19_1$ and $19_2$ on the cam plate 18 are engaged with the operation ends 12*a* and 12*b* of the holding frames $12_1$ and $12_2$ which hold the pinch rollers $13_1$ and $13_2$, respectively, and are engaged with the shiftable plate 6 by the actions of the springs 9. The cam plate 18 is provided with cam surfaces 18*a* and 18*b* on its opposite sides which surfaces are eccentric with respect to the rotational shaft 17, that is, partially circular, the center being behind the rotational shaft 17, and provided rearwardly with the two cam valleys 18*d* and 18*e* between which a peak portion 18*c* is provided. A plunger 20 adapted to rotate the cam plate 18 has a shift shaft 20*a*. One end of a lever 22 is pivotably mounted on a shaft 21 and is connected with the shaft 20*a* by a pin 20*b* provided on the shaft 20*a*. The other end of the lever 22 is connected with a lever 24 by a screw 25. The lever 24 is supported rotatably on the shaft 21 and is biased by a spring 23 to urge it in a counterclockwise direction. On the other end of the lever 24, a cam lever 27 is pivotably supported, and the cam lever has a pin 26 at the remote end thereof from the connection of the lever 24 which pin is adapted to enter the valleys of the cam plate 18. The pin 26 is pinched between extensions 31*a* and 31*b* extending in parallel from a wire spring 31 secured by a screw 30 to a spring holding lever 29 pivotably mounted on a shaft 28. A pin 32 is disposed on the spring holding lever 29 and is adapted to prevent excessive deformation of the extensions 31a and 31b of the wire spring 31. A pin 33 is also fixed on the lever 29 and serves to bias the spring holding lever 29 in a counterclockwise direction by a spring 34 provided between it and the chassis.

Further, the pin 33 contacts with a slope portion 35a of a shift lever 35 which will be described hereinafter, so that in the non-operating state (FIG. 1 and FIG. 2), the shaft 28, the pin 33, the pin 32 and the pin 26 are aligned in a substantially straight line. However, the pivot shaft 17 of the cam plate 18 is shifted toward the plunger 20 so that when the pin 26 is shifted from this position along the wire spring 31, the pin 26 is always disposed in the valley 18e. Arms $36_1$ and $36_2$ are pivotably mounted on shafts $37_1$ and $37_2$, respectively; the arm $36_1$ is provided with a pin $38_1$ and a recess 36a adapted to engage with the pin $19_1$ on the cam plate 18; and the arm $36_2$ is similarly provided with a pin $38_2$ and a recess 36b adapted to engage with a pin $19_2$ on the cam plate 18. Both arms $36_1$ and $36_2$ are pulled toward each other by a spring 39.

A pin 42 provided at one end of an L-shaped lever 40 pivotably mounted on a shaft 41, as shown in FIG. 1, contacts the cam surface 18a of the cam plate 18 by a forward pulling action of a spring 45 of a pulling lever 44 connected at one end with the lever 40 and having at the other end an idler 43 and the spring 45. Similarly, a pin 48 provided on one end of a driving lever 47 pivotably mounted on a shaft 46 contacts the cam surface 18b by a spring 49. A pulley 50 and an idler 51 rotated therewith are pivotably mounted on the other end of the lever 47, in which the pulley and the idler are driven by a rotational force transmitted from the fly wheel $2_2$ through a belt 52. A slide lever 53 for fast forward winding and a slide lever 54 for fast rewinding are carried in such a way that they can move to and fro and are biased by springs $55_1$ and $55_2$, respectively.

The lever 53 has a cam portion 53a and a protrusion 53b, and the lever 54 has a cam portion 54a and a protrusion 54b. Levers $58_1$ and $58_2$, pivotably supporting levers $57_1$ and $57_2$ respectively, are mounted pivotably on shafts $60_1$ and $60_2$ and have protrusions 58a and 58b for restricting the pivotal movements of the levers $57_1$ and $57_2$, respectively. One of the ends of the levers $57_1$ and $57_2$ supporting idlers $56_1$ and $56_2$, respectively, contacts with the cam portions 53a and 54a under the influence of springs $59_1$ and $59_2$ provided between the slide levers 53 and 54 and levers $58_1$ and $58_2$ pivotably supporting the other ends of the levers $57_1$ and $57_2$, respectively. A pin 61 is provided on the rear end of the slide lever 54 for rewinding, and the pin 61 engages with a slot provided on one end of a connecting lever 62 pivotably mounted on the shaft 63 and having a hole on the other end into which one end of the shift lever 35 enters and engages. The pin 33 on the spring holding lever 29 contacted with the slope portion 35a of the shift lever 35 by the spring 34 is contacted with a step portion 66a of a locking lever 66 mounted pivotably on the shaft 64 by a spring 65. Further, the locking lever 66 has a recess 66b on a portion thereof following the step portion 66a which is adapted to engage with the pin 33 when the shift lever 35 is shifted, and the other end 66c is in a position where it engages with the shift shaft 20a of the plunger 20. A release lever 67 whose width is substantially equal to the distance between the pins $38_1$ and $38_2$ of the arms $36_1$ and $36_2$ in the non-operating state has recesses 67a and 67b on the rear portion thereof which normally do not restrict the pivotal movements of the arms $36_1$ and $36_2$ and is drawn forwardly by a spring 68. The release lever 67 is further provided with wing portions 67d and 67c engaging respectively with protrusions 53b and 54b of the slide levers 53 and 54.

An eject button 69, a forward feeding button 70 and a reverse feeding button 71 are guided and supported by a holding plate 72 respectively and urged forwardly by springs 73a, 73b and 73c inserted respectively into H-shaped recesses thereof. A detent member 74 and stoppers 75a and 75b contact with the holding plate 72. In addition, the respective buttons 69, 70 and 71 contact with the front end portions of the release lever 67 biased by the spring 68, the slide lever 53 for fast forward rewinding biased by the spring $55_1$ and the slide lever 54 for fast rewinding biased by the spring $55_2$.

The detent 74 of the eject button 69 may operate a release mechanism of a tape cartridge (not shown) when the button 69 is depressed. The slide lever 76 is supported by the holding plate 72 slidably in lateral direction and has inclined portions on the opposite ends thereof with which the stoppers 75a and 75b of the buttons 70 and 71 are engaged so that it is impossible to depress the two buttons at one time. The slide lever 76 is maintained at the center position by the springs 77 and 78. Reel shafts 81 and 82, adapted to be inserted into and engaged with reels disposed in the tape-cartridge, are connected frictionally with reel stages 79 and 80, respectively, and are secured to pulleys 83 and 84, respectively.

Figure 2:
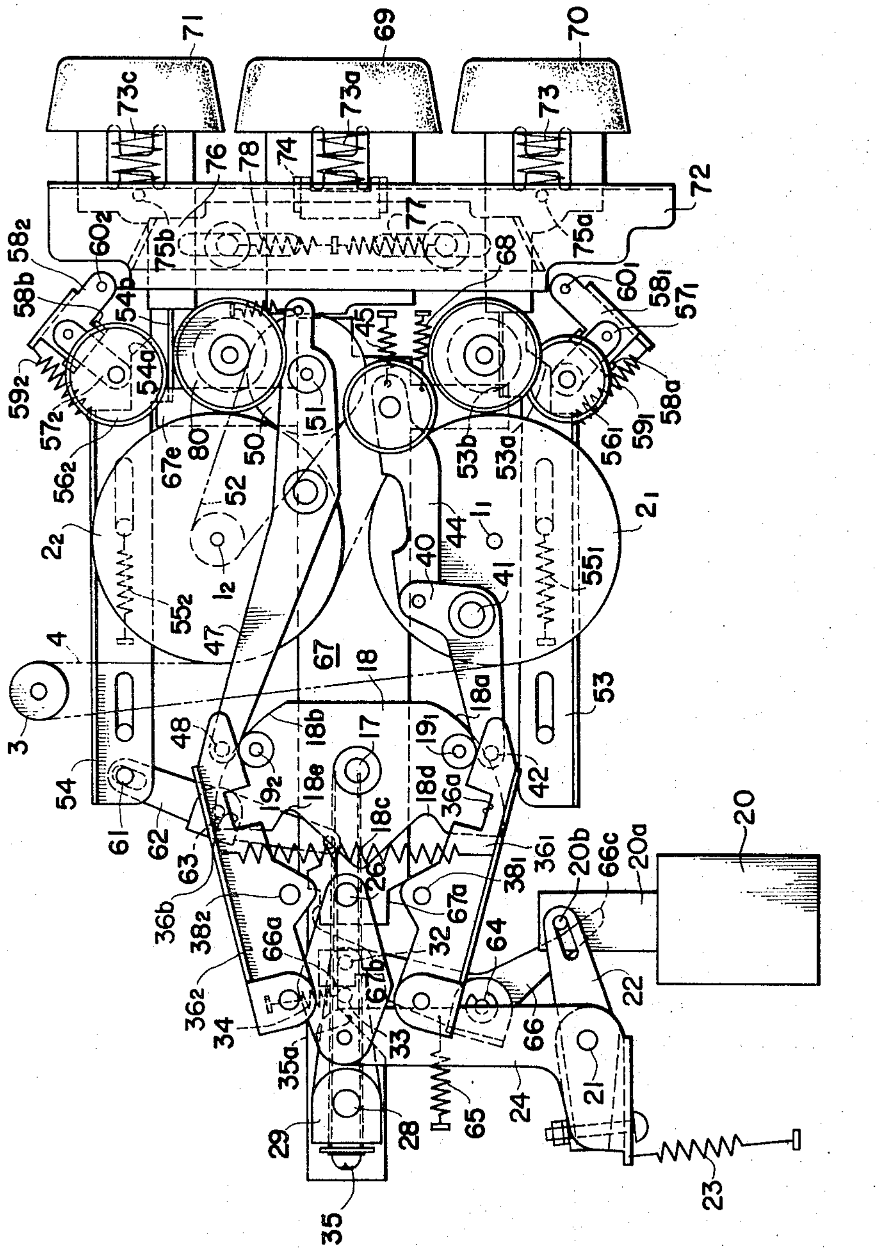
FIG. 2 is a plan view of a driving mechanism including a feeding mechanism for rewinding, shown in FIG. 1.

In operation, the shiftable base plate 6 provided with the pinch-rollers $13_1$ and $13_2$ and the magnetic head 11, and shown in FIGS. 1 and 2 in non-operating state, is rearwardly drawn by the springs 9 and in contact with the pins $19_1$ and $19_2$ of the cam plate 18. When a tape-cartridge is inserted into the apparatus in the non-operating state, the capstans $1_1$ and $1_2$, the pins $5_1$ and $5_2$ for positioning and reel shafts 81 and 82 are entered into the tape-cartridge and then a switch (not shown) is closed to thereby actuate the plunger 20.

With the actuation of the plunger 20, the lever 24 is pivoted so that the pin 26 of the cam lever 27 slides down to the valley portion 18e of the cam plate 18 to contact with the bottom of the valley and then to rotate the cam plate 18 around the rotation shaft 17. Simultaneously, the pin $19_2$ forces the shifting base plate 6 forward and, at the same time, the pin $19_1$ is retracted to be separated from the shifting base plate 6 and the operation end 12a of the holding frame $12_1$, so that the pinch roller $13_1$ contacts with the capstan $1_1$ and the pin $19_1$ engages with the recess 36a of the arm $36_1$, thereby establishing a reproduction state with normal feeding. To this end the tape is taken up from the reel shaft 82 to the reel shaft 81. When the cam plate 18 is rotated, the driving lever 47 having the pin 48 contacting with the cam surface 18b is rotated in a clockwise direction around the shaft 46 and, because the pin 42 of the L-shaped lever 40 is separated from the cam surface 18a, the lever 40 connected to the pulling lever 44 is drawn together with it by the spring 45.

Figure 3:
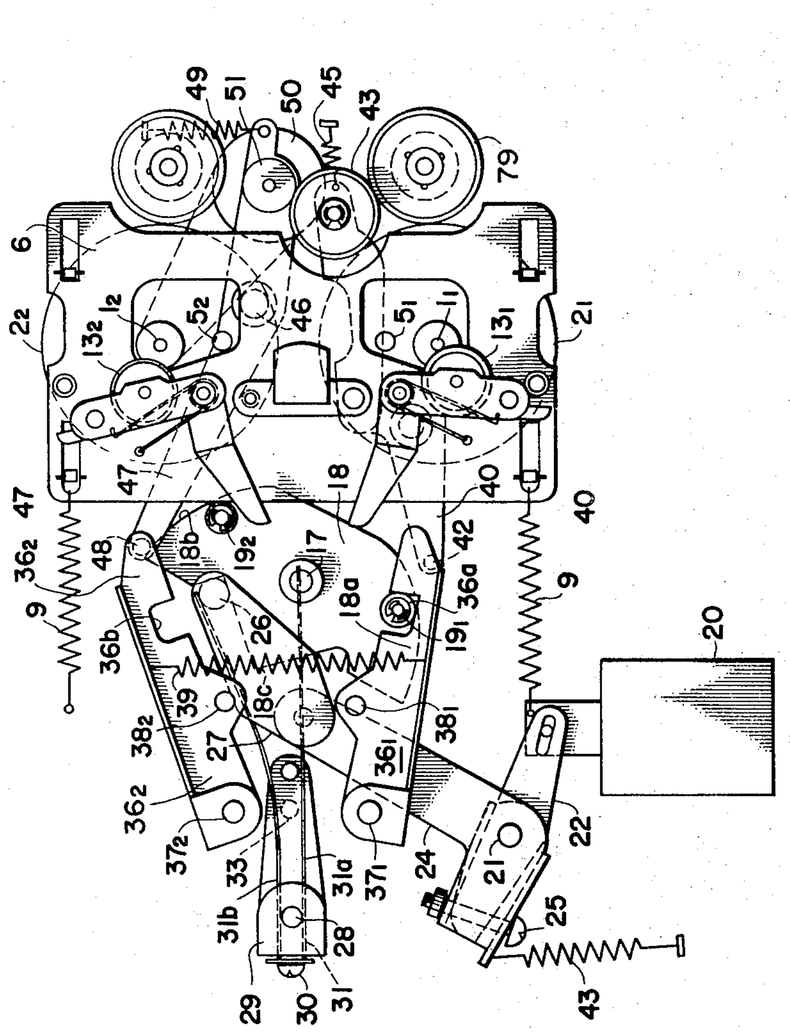
FIG. 3 is a plan view of the present apparatus in the normal feeding condition.
Figure 4:
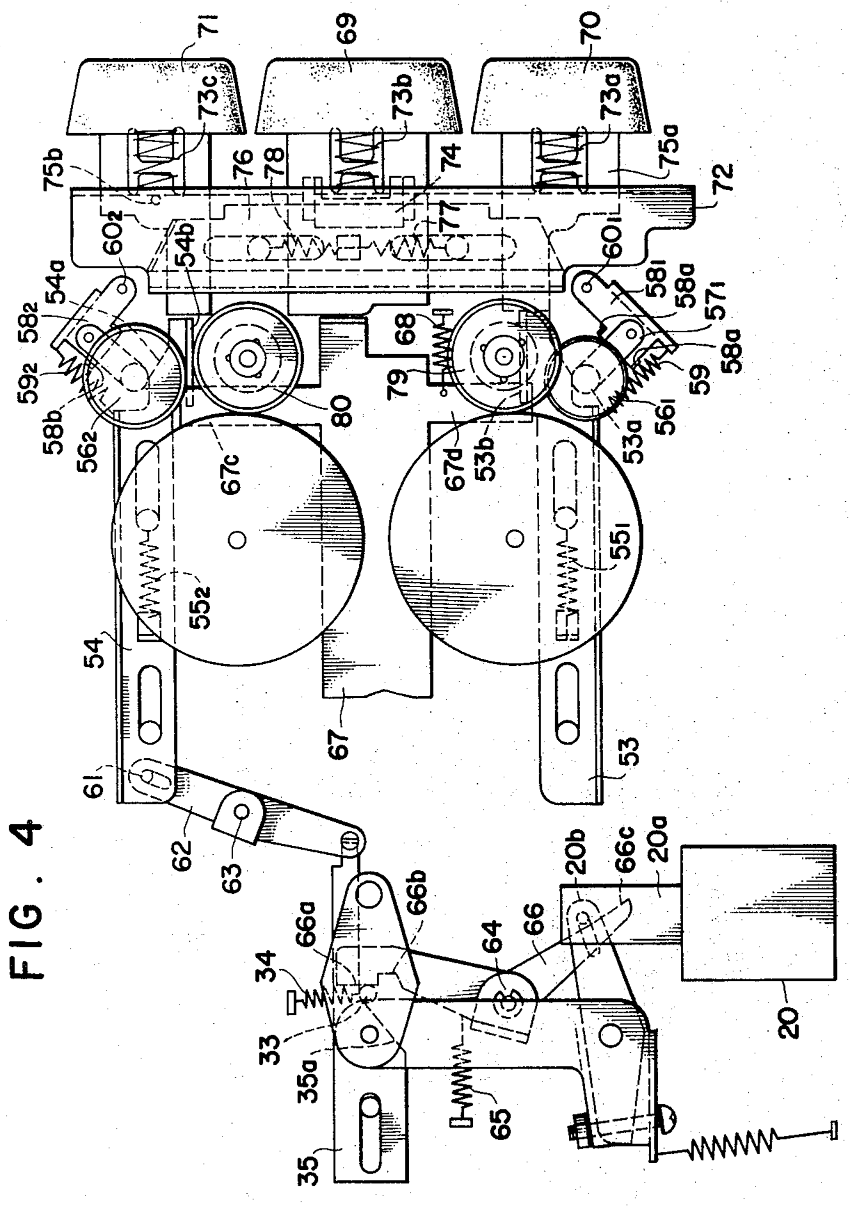
FIG. 4 is a plan view of the present apparatus in the fast feeding condition.

Thus, the rotation of the fly-wheel $2_2$ is transmitted through the pulley 50 and the idlers 51 and 43 to the reel stage 79 to wind up the magnetic tape as shown in FIG. 3. The other pinch roller $13_2$ does not contact with the capstan since the pin $19_2$ of the cam plate 18 is engaged with the operation end 12b of the holding frame $12_2$. After the pin $19_1$ of the cam plate is engaged with the recess 36*a* of the arm $36_1$, the plunger 20 is released electrically, and the pin 26 of the cam lever 27 thus returned by the spring 23 is returned by the wirespring 31b from the state shown in FIG. 3 to that shown in FIG. 1.

When the magnetic tape is to be rewound, the reverse feeding button 71 is partially depressed, i.e., depressed up to a position at which the idler $56_2$ does not contact with the reel stage 80 and the fly wheel $2_2$, and so that the protrusion 54b of the slide lever 54 does not contact with the release lever 67. With such depression of the button 71, the plunger circuit is closed to energize the plunger 20 and the preceding operation is released.

Since, when the plunger 20 is actuated, the apex 18*c* of the cam plate 18 has been rotated as shown in FIG. 3, the pin 26 of the cam lever 27 is guided by the wire spring 31 to insure that the pin 26 enters into the valley 18*d* of the cam plate. When the pin 26 is inserted in the valley 18*d*, the side portion of the cam lever 27 depresses the pin $38_1$ of the arm $36_1$ to rotate the arm $36_1$, thereby releasing the pin $19_1$ from the recess 36*a* so that the shift base plate 6 is retreated. After the feeding of the magnetic tape is stopped for a very short time by this operation, the pin 26 entered into the valley 18*d* rotates the cam plate 18 in a counterclockwise direction and holds it by the recess 36*b* of the arm $36_2$, in a manner similar to the preceding operation. At this time the pinch roller $13_1$ is retreated by the pin $19_1$ and the pinch roller $13_2$ disposed oppositely to the roller $13_1$ contacts with the capstan $1_2$ to pinch the tape and to feed it. The pin 48 of the driving lever 47 is also separated from the cam plate 18*b* and the idler 51 is pulled by the spring 49 to contact with the reel stage 80 so that the tape is wound up on the reel stage 80 side.

It will be clear that, by partially depressing the forward feeding button 70 to actuate the plunger 20 again, the tape can be fed in the forward direction. Further, by providing a suitable detecting means for detecting the end of reproduction (or recording) of the magnetic tape on the supply reel side, the plunger 20 can be actuated upon the detection to feed the tape in the reverse direction.

When the fast feeding of the magnetic tape is desirable in, for example, a direction toward the reel stage 79, the forward feeding button 70 is completely depressed. With the complete depression of the forward feeding button 70, the fast forward winding slide lever 53 is shifted rearwardly against the spring $55_1$ and the protrusion 53*b* thereof contacts with the wing portion 67*d* of the release lever 67, and thus the lever 67 comes into contact with the pin $38_1$ or $38_2$ of the arm $36_1$ or $36_2$, causing the arm $36_1$ or $36_2$ to be rotated and the pin $19_1$ or $19_2$ of the cam plate 18 to be released from the recess 36*a* or 36*b*, so that the shift base plate 6 is retreated to disengage the pinch roller and the capstan from each other. The lever $57_1$ causes the cam portion 53*a* to shift by the action of the spring $59_1$ due to the shift of the slide lever 53 so that the idler $56_1$ engages with the flywheel $2_1$ and the pulley 83 secured to the reel stage 79 to establish the fast forward winding condition. When the depression of the button 70 is released, the plunger 20 of the mechanism which is at that time in the condition shown in FIG. 1 is actuated by an electrical circuit such that the pin 26 enters the valley 18*e* of the cam plate 18 to thereby perform the normal feeding operation.

In the same manner, when it is desired to wind-up the magnetic tape on the reel stage 80 side, the reverse feeding button 71 is depressed completely to retreat the slide lever 54 so that the release lever 67 releases the holding of the cam plate 18 by the arm $36_1$ or $36_2$, and, at the same time, the idler $56_2$ is pulled by the spring $59_2$ and engages the fly wheel $2_2$ with the pulley 84 (shown by the broken lines) secured to the shaft of reel stage 80 to thereby establish the fast rewinding condition. When the slide lever 54 for the rewinding is shifted rearwardly, the connecting lever 62 engaging with the pin 61 on the slide lever 54 is rotated about the shaft 63, and the other end of the connecting lever 62 shifts the shifting lever 35 forwardly to shift the pin 33 of the spring hold lever 29 along the slope portion 35*a* and then to engage the pin 33 with the recess 66*b* of the lock lever 66. That is, the above mechanism is provided to move the magnetic tape in the same direction as that in the fast rewinding operation by the action of the plunger 20 when the reverse feeding button 71 is released, the holding lever 29 is rotated about the shaft 28, and the pin 26 of the cam lever is pinched between the end portions 31*a* and 31*b* of the wire spring 31 which have been rotated up to a position corresponding to the valley 18*d* of the cam plate 18. Since when the plunger 20 is actuated in order to move the magnetic tape in the reverse direction, the end portion 66*c* of the lock lever 66 engages with the pin 20*b* of the plunger 20 to thereby rotate the plunger 20 about the shaft 64, the pin 33 is separated from the recess 66*b* of the lock lever 66 and the recording and/or reproducing in the reverse direction is performed, whereby upon the subsequent actuation of the plunger 20 it is insured that the magnetic tape is fed in the forward direction accurately.

When it is desired to remove the tape cartridge from the present tape recorder, the eject button 69 is depressed to retreat the release lever 67 so that the holding of the arm $36_1$ or $36_2$ of the cam plate 18 is released and the detent member 74 releases a tape cartridge holding mechanism (not shown), whereby the cartridge can be readily removed by pulling it out.

What is claimed is:

1. In a tape recorder for recording or reproducing in either a forward or reverse direction having a magnetic head, two capstans for feeding a tape forward or backward, a flywheel connected to each capstan, two pinch rollers alternately cooperating with the capstans, and two reel shafts upon which are placed the tape feed and the take up reels, the improvement comprising:

a. driving means to effect recording or reproducing at normal speed, b. mechanical means connecting said driving means to said flywheels such that said flywheels are rotated in opposite directions, c. feed direction changing means engaging said pinch rollers to cause one of said pinch rollers to engage one of said capstans or the other of said pinch rollers to engage the other of said capstans to change the direction of the tape feed, d. means to effect a fast tape feed in either the forward or reverse direction, e. control means to engage or disengage said fast tape feed means, f. means connecting said fast tape feed control means to the feed direction changing means such that both of said pinch rollers are disengaged from both of said capstans when said fast tape feed means are engaged, and g. means for corresponding the tape feeding direction in both fast and normal tape feed speeds to automatically engage either pinch roller with its corresponding capstan upon disengagement of the fast tape feed means such that the direction of the tape during normal tape feed is the same as during the fast tape feed operation.

2. A tape recorder as claimed in claim 1, wherein said means for corresponding the tape feeding directions are adapted to hold said feeding direction changing means in the feeding condition and to release said feeding direction changing means simultaneously with the change from the fast feeding to the reproducing operation at normal speed.

3. A tape recorder as claimed in claim 2, wherein said feeding direction changing means comprises a cam plate for pressing a pair of pinch rollers and capstan to each other and contacting a head to the tape and being alternatively rotatable through a substantially fixed angle in a clockwise direction and in a counterclockwise direction, rotating means for rotating said cam plate alternatively in said directions, holding means supporting said magnetic head in a position where said magnetic head contacts the tape in response to the rotation of said cam plate, and lock means for locking said cam plate in a rotated position.

* * * * *